Patented Sept. 15, 1925.

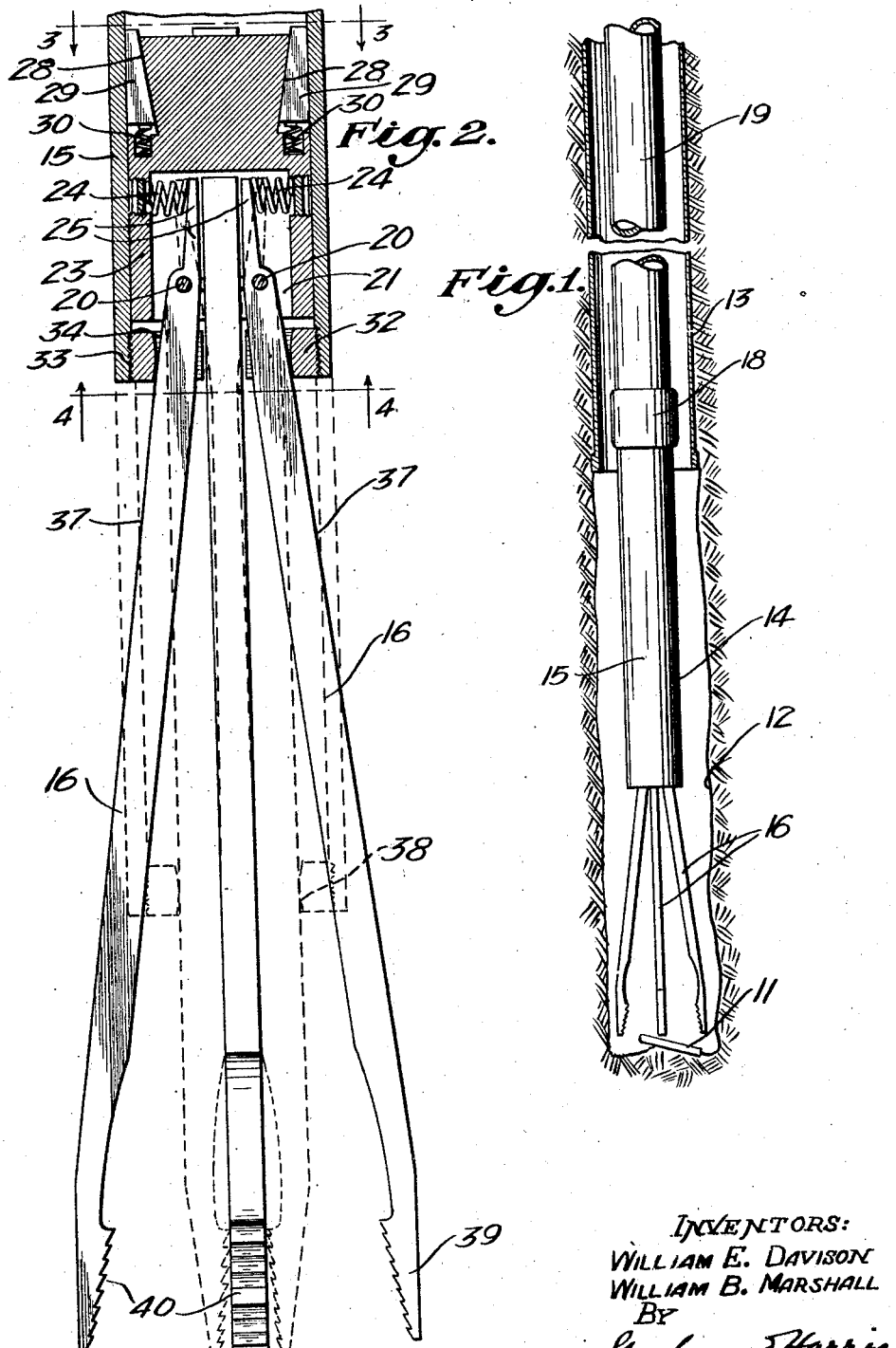

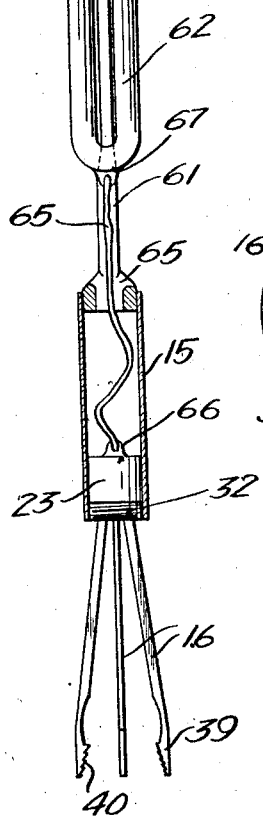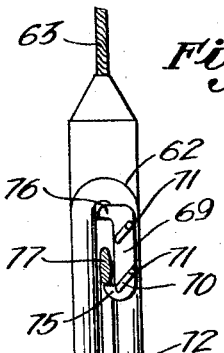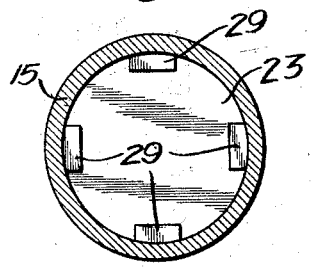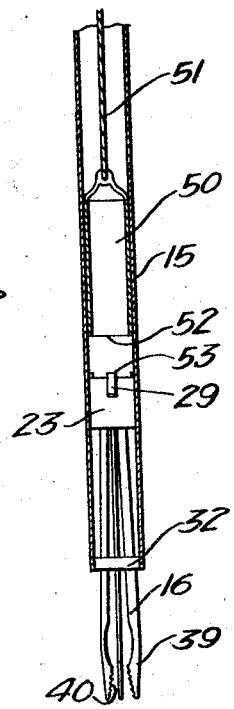

1,553,991

UNITED STATES PATENT OFFICE.

WILLIAM E. DAVISON AND WILLIAM B. MARSHALL, OF FELLOWS, CALIFORNIA.

FISHING TOOL.

Application filed February 20, 1923. Serial No. 620,217.

*To all whom it may concern:*

Be it known that we, WILLIAM E. DAVISON and WILLIAM B. MARSHALL, both citizens of the United States, residing at Fellows, in the county of Kern and State of California, have invented a new and useful Fishing Tool, of which the following is a specification.

This invention relates to fishing tools employed in well drilling for removing articles from the hole being drilled. In the drilling of wells, it often occurs that tools or portions thereof become lost in the hole and the presence thereof makes further drilling impossible. The lost article must be removed or the hole drawn to the side in order to pass to one side of the impediment. A portion of a drill bit, or a disc from a rotary disc bit will cause serious trouble at the bottom of a well and therefore much time and labor is expended in endeavoring to remove such pieces from the hole.

It is an object of our invention to provide a means whereby an article of this character may be removed from the hole in a minimum time and with a minimum expenditure of labor. Fishing tools are at present provided by which such articles are removed from the hole when the article is centralized upon the bottom, but if the article to be removed is not absolutely central, it is often shoved to the side in the attempts to grapple it with a fishing tool, which makes its removal from the hole still more difficult.

It is an object of our invention to provide a fishing tool which will engage a non-central article and will draw it over to the center of the hole instead of shoving it to one side as is often done with the present type of fishing tool.

The especial advantages of the invention and further objects thereof will be made evident hereinafter.

Referring to the drawings which are for illustrative purposes only,

Fig. 1 is a sectional view showing one manner in which the invention may be employed.

Fig. 2 is an enlarged partially sectioned view showing the fishing tool jaws and the members by which they are supported.

Fig. 3 is a section taken upon a plane represented by the line 3—3 of Fig. 2.

Fig. 4 is a section taken upon a plane represented by the line 4—4 of Fig. 2.

Fig. 5 is a diagrammatic section showing a device which may be employed to release the slips of the device shown in Fig. 1.

Fig. 6 is an elevational view showing the manner in which the invention may be employed in suspension with jars which are supported by a cable.

As shown in Fig. 1 a broken portion of a fish tool bit or a disc of a rotary disc bit 11 may be lost in the bottom of a hole 12 which is being drilled and in which casing 13 is being set. Our invention provides a fishing tool 14 which is comprised of a sleeve member 15 and jaw members 16. The sleeve 15 may be joined by a suitable coupling 18 to the lower end of a string of drill pipe 19 or it may be supported as shown in Fig. 6 from a cable. In Fig. 2 the lower end of the sleeve 15 from which the jaw members 16 extend is shown. These jaw members are pivoted at their upper ends upon pins 20 within recesses 21 formed in the lower end of a head 23 which operates within the sleeve 15. Springs 24 are provided which force inwardly against the upper ends 25 of the jaw members 16 and thus maintain the jaw members normally spread apart, as shown in full lines in Figs. 1 and 2. In slots 28 formed in the upper end of the head 23 slips 29 are situated, these slips being supported by springs 30. The slips 29 have the function of preventing an upward movement of the sleeve 15 relative to the head 23. It will be noticed, however, that these slips do not prevent a downward movement of the sleeve 15 upon the head 23. In the lower extremity of the sleeve member 15, a slotted plate 32 is secured, preferably by threaded engagement 33. This plate 32 as shown in Fig. 4 is provided with radially extending slots 34 in the form of a cross 35 through which the jaw members 16 extend.

When the fishing tool is being lowered into a well, the head 23 is disposed at the lower end of the sleeve 15 and the jaws 16 are spread apart. Upon reaching the bottom of the well, the downward movement of the jaws is interrupted, whereupon the sleeve slides downwardly upon the head 23 and the member 32 slides downwardly upon the sloping outer faces 37 of the jaws 16, forcing them together as indicated by the dotted lines 38 in Fig. 2, and as shown in full lines in Fig. 5. It will be noticed that upon the downward movement of the sleeve or tubular member 15, the lower ends 39 of the jaws 16 move radially inwardly so that any object over which the jaws may pass will be gripped by the teeth 40 formed at their lower ends 39. It will also be recognized that in event the lost article being fished for is to one side in the bottom of the hole, that the movement of the jaw member in contact therewith will have the tendency to draw the object towards the center of the hole, so that after a number of trials, the object will be sufficiently centralized for the jaws to pass thereover.

When the sleeve has moved downwardly upon the head 23, it is impossible for it to move upward relatively thereto owing to the presence of the slips. Therefore, a lifting action exerted upon the string of drill pipe 19 is transferred directly to the head 23 through the slips so that the entire fishing tool will be raised without a relative downward movement of the jaws which would allow them to expand. Therefore, an article gripped by the jaws will be firmly held therein until the slips 29 are released so that the head 23 is allowed to return to the position at the bottom of the sleeve 15, in which position it is shown in Fig. 2.

As shown in Fig. 5 of the drawing, our invention provides means for releasing the slips either when the fishing tool is in the hole, or when it has been removed therefrom, therefore making it unnecessary to remove the entire string of drill pipe from the hole in order to reset the slips preliminary to making another trial. This means for resetting the jaws is illustrated in Fig. 5 and comprises a sleeve 50 which is suspended in the upper end of the sleeve 15 upon a cable 51. By dropping the sleeve 50, the lower edge 52 thereof is brought in forcible contact with the upwardly projecting ends 53 of the slips 29 and they are thereupon forced downwardly out of clamping position between the head 23 and the inner wall of the sleeve 15, thus allowing the head 23 to move downwardly within the sleeve and allowing the jaw members 16 to again be spread apart by the springs 24. Therefore, it is possible to reset the jaws in expanded position any number of times within the hole by merely raising the string of drill pipe by which it is supported several feet, and then jogging the cable 51 shown in Fig. 5 so that the inner sleeve 50 will be brought against the slips 29. By this arrangement much time is saved by not having to remove the fishing tool from the hole at each failure to grip the object being fished for.

As shown in Fig. 6 of the drawing, the sleeve 15 may be secured to the lower end 60 of the lower jaw member 61 which cooperates with an upper jaw member 62 having a cable 63 attached thereto. The head 23 in this instance is not provided with slips and the direct lift thereupon, when the fishing tool is being lifted, is accomplished through a cable 65 which extends from a fixture 66 in the top of the head 23 to the lower end 67 of the upper jaw member 62. A catch plate 69 having slots 70 therein is mounted upon pins 71 at the upper end of the channel 72 in which the lower jaw member 61 slides. This plate 69 is provided with a catch projection 75 at its lower end and a projection 76 at its upper end. When the plate 75 slides downwardly upon the pins 71, the catch 75 projects under the return bend 77 of the lower jaw member 61, thus providing a means whereby the sleeve 15 and the lower jaw member 61 may be supported in raised position relative to the upper jaw member during the lowering of the fishing tool into the hole. Upon striking or coming in contact with the object being fished for, the upper jaw member 62 moves downwardly upon the lower jaw member 61 so that the return bend 77 strikes the upper projection 76 and causes the plate 69 to move upwardly upon the pins 71. As this plate 69 moves upwardly, it also must travel outwardly upon the pins 71 due to the slope of the slots 70, and upon removal the catch 75 from the path of the return bend 77, permits a relative downward movement of the lower jaw member 61 until the cable 65 is stretched tight. It will be seen that at this time a lift exerted through the cable 63 upon the upper jaw member 61 is transferred through the cable 65 to the head 23, and that the lower jaw member and a sleeve 15 is carried by the member 32 situated in the lower end of the sleeve 15; and that therefore, the weight of the lower jaw member and the sleeve acting upon the member 32, serves to hold the jaw members forcibly together so that any article engaged thereby will be securely gripped.

We claim as our invention:

1. In a fishing tool, the combination of: a head; a plurality of jaw members pivotally secured to said head; means for holding said jaw members normally spread apart; a member adapted to slide down on said jaw members so as to force them together; a tubular member extending downwardly over said head and supporting said sliding member; and slips operative between said head and said tubular member whereby a lifting action applied to said tubular member will be transferred to said head.

2. In a fishing tool, the combination of: a head; a plurality of jaw members pivotally secured to said head, said jaw members having upper legs; spring members engaging said upper legs for holding said jaw members normally spread apart; a member adapted to slide down on said jaw members so as to force them together; a tubular member extending downwardly over said head and supporting said sliding member; and slips mounted in said head and operative between said head and said tubular member whereby a lifting action applied to said tubular member will be transferred to said head.

3. In a fishing tool, the combination of: a head; a plurality of jaw members downwardly suspended from said head; means for holding said jaw members normally spread apart; a member adapted to slide down on said jaw members so as to force them together; a tubular member extending downwardly over said head and supporting said sliding member; slips mounted in said head and operative between said head and said tubular member whereby a lifting action applied to said tubular member will be transferred to said head; and means for releasing said slips.

4. In a fishing tool, the combination of: a head; a plurality of jaw members downwardly suspended from said head; means for holding said jaw members normally spread apart; a member adapted to slide down on said jaw members so as to force them together; a tubular member extending downwardly over said head and supporting said sliding member; slips mounted in said head and operative between said head and said tubular member whereby a lifting action applied to said tubular member will be transferred to said head; and a sleeve member adapted to slide within said tubular member for releasing said slips.

5. In a well fishing tool, the combination of: a head; a plurality of jaw members suspended from said head; means for holding said jaw members normally spread apart; a member adapted to slide down on said jaw members so as to force them together; and separate means reciprocal in the well for resetting said members.

In testimony whereof, we have hereunto set our hands at Fellows, California, this 13th day of February 1923.

WILLIAM E. DAVISON.
WILLIAM B. MARSHALL.